UNITED STATES PATENT OFFICE.

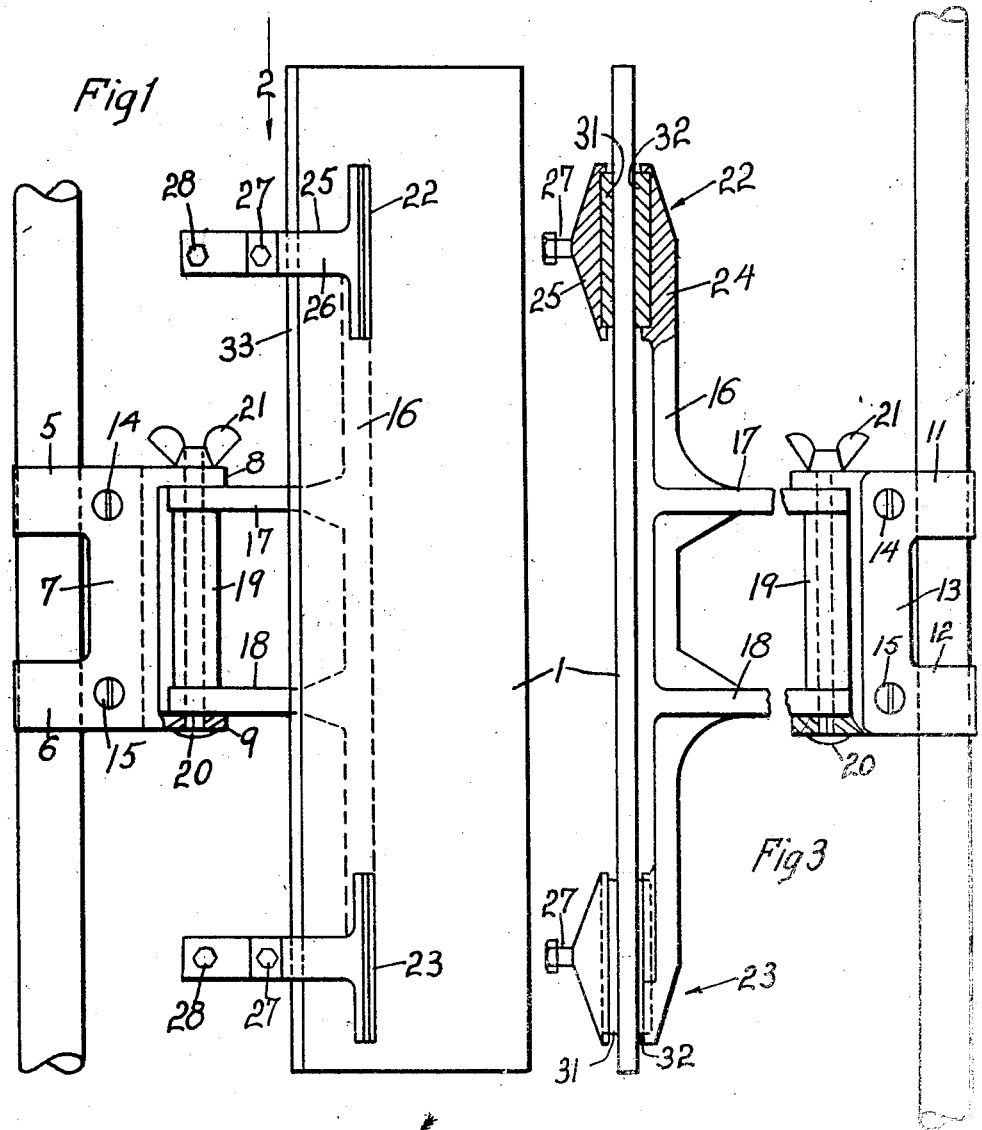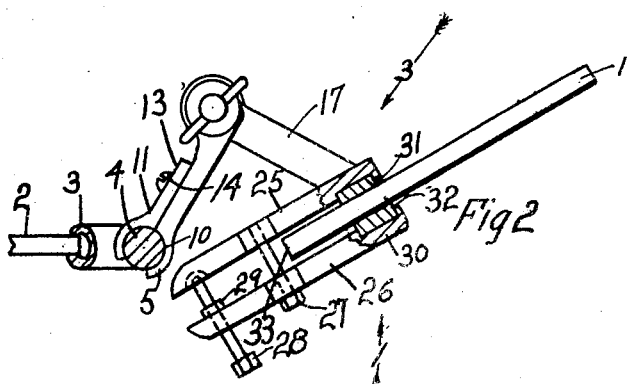

GEORGE GLAUDEL, OF LOS ANGELES, CALIFORNIA, ASSIGNOR, BY DIRECT AND MESNE ASSIGNMENTS, OF ONE-HALF TO GEORGE L. MITCHELL, OF SANTA MONICA, CALIFORNIA.

AUXILIARY WINDSHIELD.

1,386,565.  Specification of Letters Patent.  Patented Aug. 2, 1921.

Application filed June 4, 1919. Serial No. 301,839.

*To all whom it may concern:*

Be it known that I, GEORGE GLAUDEL, a citizen of France, residing at Los Angeles, in the county of Los Angeles and State of California, have invented new and useful Improvements in Auxiliary Windshields, of which the following is a specification.

My object is to make an improved auxiliary wind shield, and my invention consists of the novel features herein shown, described and claimed.

One of the leading features of my invention is the mounting of an auxiliary wind shield glass without perforating the glass or putting a frame around the glass so that the glass may be readily adjusted or removed.

Figure 1 is a view in elevation of an auxiliary wind shield embodying the principles of my invention attached to the side bar of a main wind shield, the side bar and main wind shield being broken away and the view being taken looking in the direction indicated by the arrow 1 in Fig. 2.

Fig. 2 is a top plan view looking in the direction indicated by the arrow 2 in Fig. 1, the main wind shield being broken away and shown in section.

Fig. 3 is a fragmentary elevation from the opposite side of that shown in Fig. 1 as indicated by the arrow 3 in Fig. 2, and parts being turned to a different angle to show the details of construction.

The auxiliary glass plate 1 is a piece of heavy glass and is flat and rectangular. Obviously the glass may have rounded edges and rounded corners if desired, the essential feature being that the glass is imperforate and plain or smooth and preferably transparent.

The main wind shield glass 2 usually has a frame 3 independent of the side bar 4, and it is the object of my invention to connect the auxiliary plate 1 to the main wind shield side bar 4 without placing the frame around the auxiliary plate and without making bored holes through the auxiliary plate.

The clamping jaws 5 and 6 are formed integral with the head 7 and the bearing ears 8 and 9 extend from the head 7 in the opposite direction from the jaws 5 and 6. The jaws 5 and 6 have curved inner faces 10 adapted to fit the side bar 4. The clamping jaws 11 and 12 are formed integral with the connecting bar 13 and fit the side bar 4 in opposition to the jaws 5 and 6. The screws 14 and 15 are inserted through one member and tapped through the other member so as to connect the jaws 11 and 12 to the jaws 5 and 6 and clamp the head 7 rigidly upon the side bar 4 at the desired angle and at the desired height, and so that by loosening the screws 14 and 15 the fitting may be readily adjusted relative to the side bar 4.

The frame bar 16 is of considerable length and is substantially straight and ribbed to be sufficiently strong. Arms 17 and 18 extend in parallel positions from near the center of the frame bar 16 and fit between the ears 8 and 9, a spacing collar 19 is placed between the ends of the arms 17 and 18, and a bolt 20 is inserted upwardly through the ears 8 and 9, through the arms 17 and 18, and through the spacing collar 19.

A wing nut 21 is placed upon the upper end of the bolt 20 so that by manipulating the wing nut to loosen the nut the frame 16 may be swung to any desired position and so that by tightening the nut 21 the ears 8 and 9 will be clamped against the arms 17 and 18 and the arms clamped against the spacing collar 19 to make a stiff joint and hold the frame bar in its adjusted position relative to the side bar 4.

Vises 22 and 23 are formed at the ends of the frame bar 16.

The vise 22 comprises a boss 24 extending longitudinally of the frame bar 16, a rigid arm 25 extending horizontally from the end of the frame bar at an acute angle relative to the arms 17 and 18, a loose arm 26 substantially like the rigid arm, a clamping screw 27 inserted loosely through the central portion of the loose arm 26 and tapped into the central portion of the rigid arm 25, and a spacing screw 28 tapped through the end of the loose arm 26 and having its point seated in the end of the rigid arm 25 and having a jam nut 29 against the inner face of the loose arm 26, so that by manipulating the screws 27 and 28 the loose arm 26 may be adjusted to or from the rigid arm 25, and so that the arms may be maintained in parallel positions, and there being a boss 30 upon the loose arm 26 in opposition to the boss 24.

The inner faces of the bosses 24 and 30 are recessed, and rubber pads 31 and 32 are placed in the recesses and extend beyond the faces of the bosses, and the glass plate 1 is inserted between the pads 31 and 32 until its edge 33 is near to or against the screw 27.

The vise 23 is identical in construction with the vise 22, and when the vises 22 and 23 are properly adjusted and the glass plate 21 placed in position and the screws 27 tightened the plate is firmly held in its adjusted position without marring or breaking the plate, and the plate may be readily removed or readjusted.

Thus I have produced an auxiliary wind shield consisting of a clamp adapted to engage the side bar of the main wind shield, a frame bar hingedly connected to the clamp and adapted to form a stiff joint, vises upon the frame bar, and a plate held in place by the vises.

Various changes may be made without departing from the spirit of my invention as claimed.

I claim:

1. A device for supporting a supplemental wind shield and which is attachable to the usual wind shield side support, comprising a pair of spaced vises having separable jaws to extend transversely across an inserted plate and between which it is vertically adjustable, a bar on the ends of which the vises are arranged, a clamp attachable to the support, said bar having an intermediate means extending laterally, and a pivot member connecting said means and said clamp, the planes of the vises and the connecting means being acute.

2. A device for supporting a supplementary windshield including a clamp for clamping on the frame of a wind shield, bearing ears on said clamp, a vertical frame, arms extending laterally from said frame intermediate its ends between said bearing ears, a bolt extending through said bearing ears and said arms for pivoting said frame on said clamp, a winged nut screwing on the end of said bolt against one of said bearing ears for holding said frame at various angles with relation to said clamp, and vises respectively at the lower and upper ends of said frame for gripping a glass shield plate.

3. A device for supporting a supplementary wind shield including a clamp for clamping on the frame of a wind shield, bearing ears on said clamp, a vertical frame, arms extending laterally from said frame intermediate its ends between said bearing ears, a bolt extending through said bearing ears and said arms for pivoting said frame on said clamp, a winged nut screwing on the end of said bolt against one of said bearing ears for holding said frame at various angles with relation to said clamp, and vises respectively on the lower and upper ends of said frame at an acute angle to said arms for gripping a glass shield plate.

In testimony whereof I have signed my name to this specification.

GEORGE GLAUDEL.